Nov. 11, 1958     M. A. THRONE ET AL     2,859,839
COMBINATION HYDRAULIC AND MECHANICAL BRAKE

Filed Dec. 21, 1953     4 Sheets-Sheet 1

INVENTOR.
Maurice A. Thorne
BY Lothrop M. Forbush

Their Attorney

Nov. 11, 1958  M. A. THRONE ET AL  2,859,839
COMBINATION HYDRAULIC AND MECHANICAL BRAKE
Filed Dec. 21, 1953  4 Sheets-Sheet 2

INVENTOR.
Maurice A. Thorne
BY Lothrop M. Forbush
Their Attorney

Nov. 11, 1958    M. A. THRONE ET AL    2,859,839
COMBINATION HYDRAULIC AND MECHANICAL BRAKE
Filed Dec. 21, 1953    4 Sheets-Sheet 3

INVENTOR.
Maurice A. Thorne
BY Lothrop M. Forbush
Their Attorney

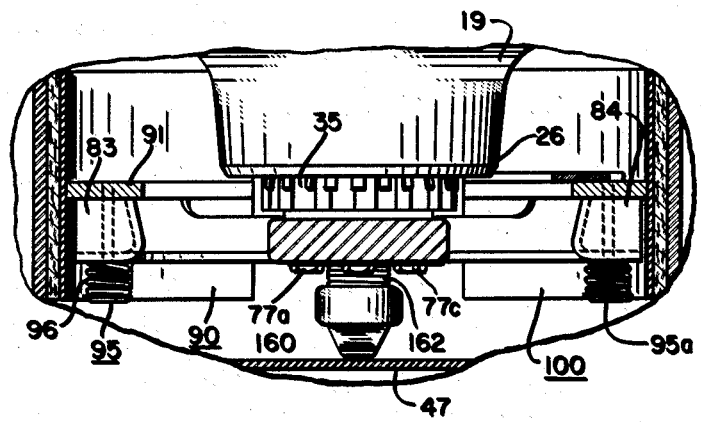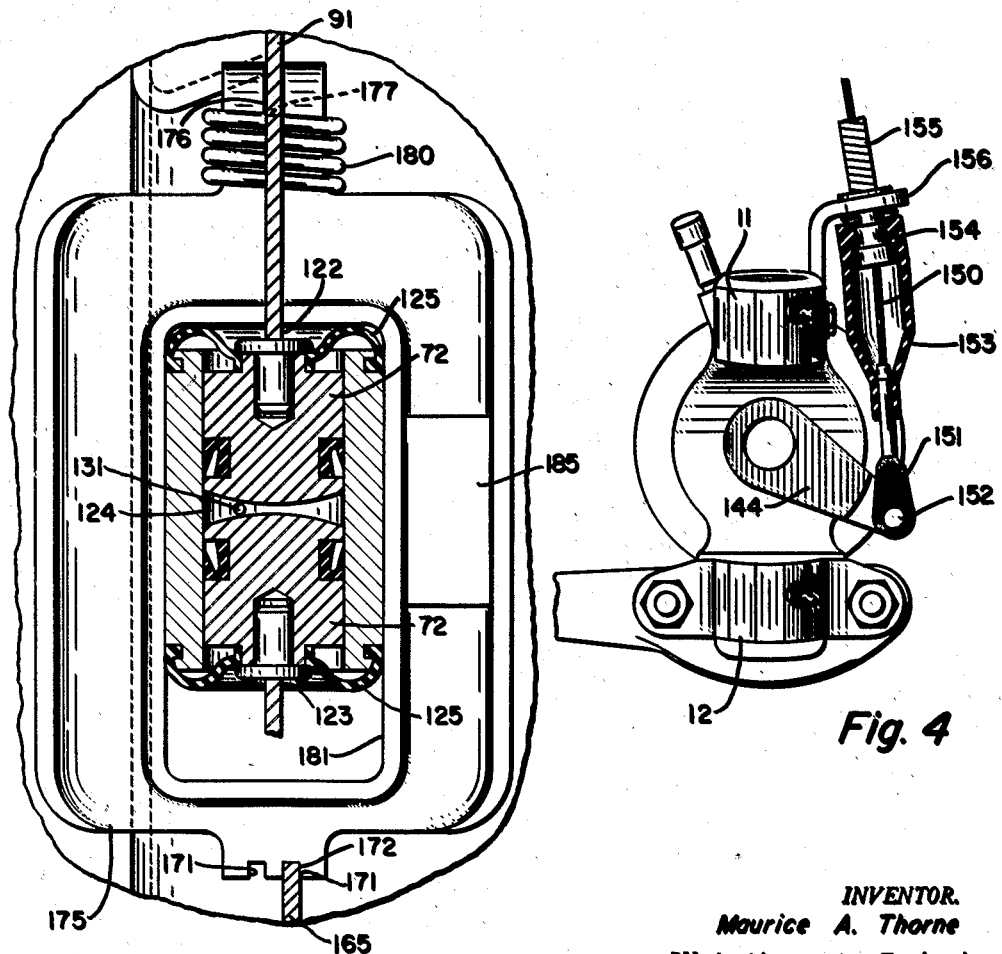

United States Patent Office 2,859,839
Patented Nov. 11, 1958

2,859,839

COMBINATION HYDRAULIC AND MECHANICAL BRAKE

Maurice A. Thorne, Detroit, and Lothrop M. Forbush, Ferndale, Mich., assignors to General Motors Corporation, Detroit, Mich., a corporation of Delaware Application December 21, 1953, Serial No. 399,524

3 Claims. (Cl. 188—78)

This invention relates to a brake structure adapted for use on motor vehicles.

An object of the invention is to provide an improved hydraulically actuated brake structure that will operate consistently more uniformly under varying operating conditions and to incorporate in such a brake structure supplementary mechanical actuation of the structure wherein both the hydraulic and the mechanical actuation of the brake structure results in duo-servo action of the brake structure.

Further objects and advantages of the present invention will be apparent from the following description, reference being had to the accompanying drawings wherein a preferred form of the invention is clearly shown.

In the drawings:

Figure 4 is an elevational view, partially in cross section, of a rear portion of the brake as viewed in the direction of the arrow 4 on Figure 2.

Figure 5 is a transverse cross sectional view of a portion of the brake mechanism as taken substantially along line 5—5 of Figure 1.

Figure 6 is a transverse cross sectional view of a portion of the brake mechanism as taken substantially along line 6—6 of Figure 1.

Figure 1:
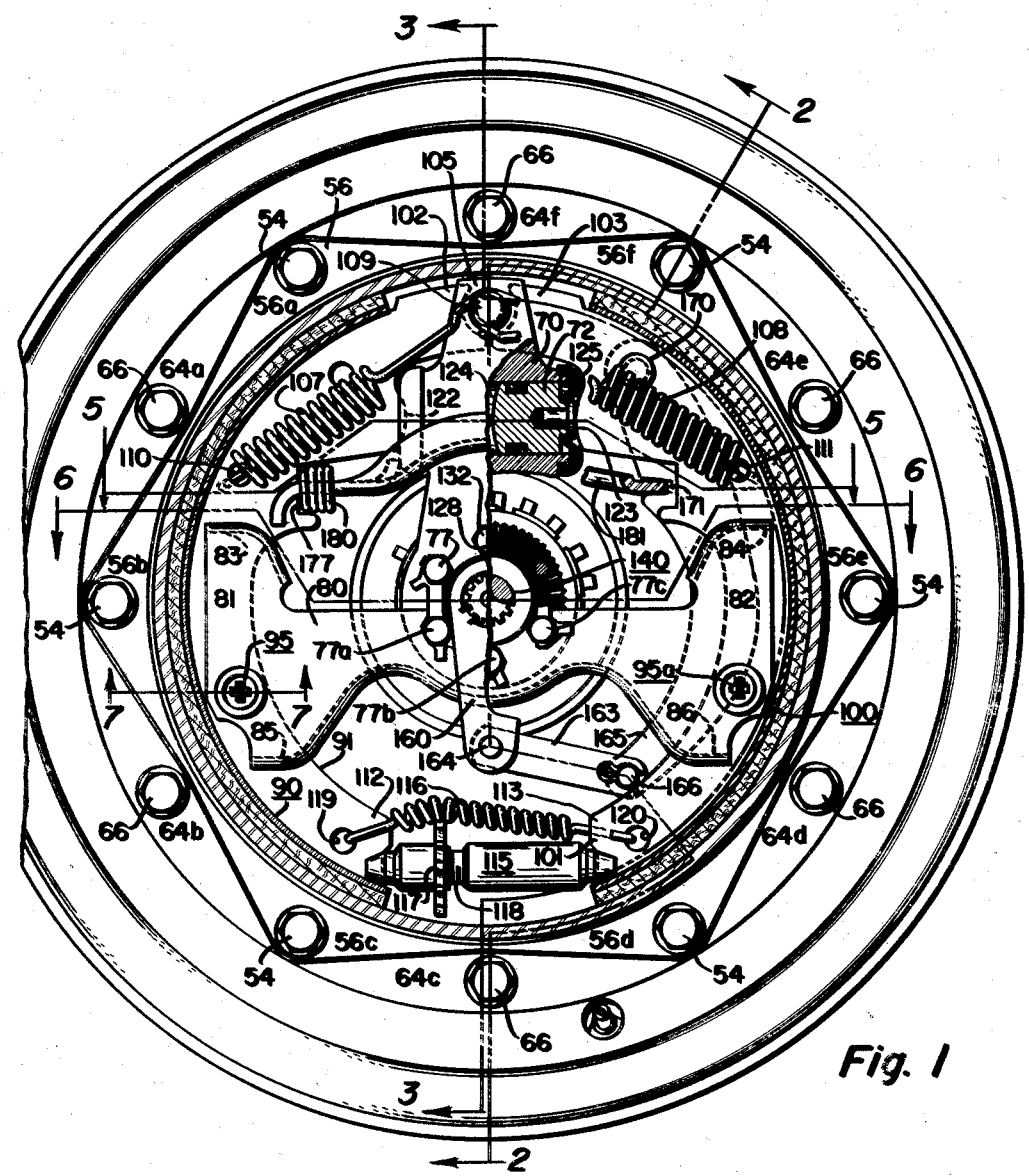
Figure 1 is a plan view of the brake mechanism of this invention, particularly in cross section as taken along line 1—1 of Figure 2.

The brake mechanism of this invention is constructed as a totally enclosed mechanism to reduce to a minimum variable brake action resulting from changing conditions of operation of a motor vehicle on which the brake is carried, such changing conditions resulting from variable road conditions over which the vehicle travels.

In this invention the brake structure is an integral part of the wheel structure and is disposed relative to the wheel structure so as to be installed from the outboard side of the wheel.

The brake includes both a hydraulic actuating mechanism for controlling brake action as well as an auxiliary mechanical actuating mechanism that operates on the same brake shoes as are under control of the hydraulic actuating mechanism. The mechanical actuating mechanism for the brake extends through the wheel axle on the out-board end of which the brake mechanism is mounted, the mechanical actuating device being carried on the in-board end of the wheel axle. The brake mechanism of this invention is carried fully on the wheel axle in a manner as will eliminate the necessity of the use of back plates as required in conventional brake mechanisms. Thus, the wheel as well as the brake mechanism is carried on the axle as an independent structure, the wheel and the brake drum being so associated as to provide a total enclosure for the brake mechanism to reduce to a minimum the adverse effects of varying weather conditions on the brake mechanism.

In the drawings, the wheel and brake mechanism is illustrated for use as the front wheel of a motor vehicle.

The motor vehicle has a spindle or axle 10 extending horizontally relative to the kingpin bearings 11 and 12 that receive a kingpin 13 journaled therein. The axle spindle 10 has an axial opening 14 extending through the spindle 10, the axial opening 14 receiving the mechanical actuating mechanism for the brake structure as hereinafter described.

The axle spindle 10 has an inboard anti-friction bearing 15 carried adjacent the kingpin 13. The bearing 15 includes an inner ball race 16 journaled on the outer periphery 17 of the axle spindle 10. An outer ball race 18 is carried in one end of the hub 19, the hub 19 being integral with the wheel flange 20 that forms one enclosing wall for the brake structure as hereinafter described.

The bearing 15 is closed by an oil seal 21 that in turn is protected by a sheet metal cover 22 enclosing the inboard end of the hub 19 as positioned between the inner race 16 of the bearing 15 and the shoulder 23 provided on the axle spindle 10.

A second anti-friction bearing 25 is provided at the outboard end 26 of the hub 19 between the hub and the periphery 17 of the axle spindle 10. This out-board bearing 25 includes an inner ball race 27 journaled on the peripheral surface 17 of the spindle 10 and an outer ball race 28 that is carried in the out-board end 26 of the hub 19. An oil seal 29 is provided between the inner race 27 of the anti-friction bearing 25 and the axial recess 30 that carries the outer ball race 28.

The outer ball race 18 of the bearing 15 is carried in the axial recess 31 in the hub 19 and engages a radial flange 32. Likewise, the outer ball race 28 carried in the axial recess 30 engages a radial flange 33 in the hub 19.

The out-board end of the axle spindle 10 has a threaded portion 34 that receives a nut 35 which engages the inner ball race 27 of the out-board bearing 25 to retain the wheel hub 19 and the bearings 25 and 15 in position on the spindle 10.

The wheel flange 20 includes a radial seating surface 40 and an axial seating surface 41 each of which is engaged by the open end 42 of a brake drum 45 whereby to locate the brake drum on the wheel flange both radially and axially relative to the axle spindle 10 whereby to insure accurate concentric positioning of the brake drum 45 relative to the axis of the wheel.

The brake drum 45 is a composite structure including a formed metal shell 46 that includes a transverse wall 47 fully closing one end of the brake drum. An annular reinforcing ring 48 is bonded to the inner periphery of the annular wall of the formed shell 46 whereby to provide a relatively stiff drum wall that is engaged by the brake shoes of the brake structure.

The brake drum 45 is carried on the radial flange 50 that extends from the wheel flange 20 as an integral part thereof, fastening studs 51 being secured in suitable openings 52 in the flange 50.

The fastening studs 51 include a threaded portion 53 that receives a retaining nut 54 which engages a tapered opening 55 provided in the radial flange 56 on the brake drum 45. As illustrated in Figure 1 the flange 56 of the brake drum 45 is a multi-sided flange member providing thereby substantially triangular shaped flange areas 56a to 56f inclusive each of which receives one of the retaining nuts 54 whereby to hold the brake drum 45 upon radial flange 50 of the wheel flange 20.

A wheel rim 60 is provided with an inwardly turned radial flange 61 secured to the rim 60 by a plurality of rivets 62. The wheel flange 61 has an internal periphery substantially matching the periphery of the flange 56 of the brake drum 45, as indicated in Figure 1, thus providing a plurality of arcuate areas 64a to 64f inclusive each of which has a tapered opening 65 that receives a fastening nut 66 that threadedly engages a fastening stud 67 mounted in the radial flange 50 of the wheel flange 20. Thus, the hexagonal shape of the flange 50 combined with the hexagonal interior of the wheel flange 61 makes it possible to provide the fastening device for the brake drum 45 and the wheel rim 60 on the same diameter from the axis of the wheel. This arrangement makes it possible to utilize a smaller diameter wheel rim or within a wheel of a given size to increase the diameter of the brake drum to give greater friction area for engagement by the brake shoes within a given wheel diameter.

The brake structure incorporated within the brake drum 45 includes a wheel cylinder 70 having a cylinder bore 71 that receives a pair of oppositely acting wheel cylinder pistons 72. The wheel cylinder 70 is carried upon the upper end of a supporting arm 73 that engages the forward face 74 of the wheel spindle 10. The forward face 74 of the wheel spindle 10 has radial splines or serrations 75 that engage corresponding and cooperating serrations or splines on the rear face 76 of the supporting arm 73. The cooperating splines or serrations prevent rotation of the wheel cylinder 70 relative to the wheel spindle 10.

The supporting arm 73 is secured to the wheel spindle 10 by a plurality of bolts 77.

A brake shoe supporting arm 80 engages the forward face 190 of the supporting arm 73 and is carried thereon and secured thereto by the bolts 77a, 77b, and 77c. The brake shoe supporting arm 80 has enlarged end portions 81 and 82 the upper ends of which are formed normal to the plane of the arm 80 to provide supporting legs 83 and 84. Corresponding supporting legs 85 and 86 are provided at the bottom ends of the brake shoe supporting arm 80.

Figure 7:
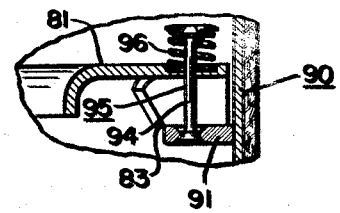
Figure 7 is a transverse cross sectional view of a part of the brake mechanism taken along line 7—7 of Figure 1.

A brake shoe 90 having the radial web 91 is carried upon the supporting legs 83 and 85 of the member 80, the radial face of the web 91 engaging the supporting legs 83 and 85 to maintain the periphery of the brake shoe coaxial with the axis of the wheel and of the brake drum 45. The web 91 of the brake shoe 90 is retained against the supporting legs 83, 85 by a resilient connection 95 illustrated in Figure 7 comprising the pin 94 and a spring 96.

Similarly, the brake shoe 100 has the radial web 101 carried upon the supporting legs 84 and 86 to position the brake shoe 100 coaxial with the brake drum 45. The brake shoe 100 is held against the supporting legs 84 and 86 by a resilient connection 95a of the same kind as that illustrated in Figure 7.

The upper ends 102 and 103 of the brake shoes 90 and 100 respectively engage opposite sides of an anchor pin 104 that is secured within a protrusion 105 extending upwardly from the brake cylinder 70. The protrusion 105 has a slot 106 that receives the ends 102 and 103 of the brake shoes 90 and 100 whereby the upper ends of the brake shoes are retained in controlled position relative to an axial position in respect to the brake drum 45.

Retraction springs 107 and 108 have one end of each of the springs engaging the protrusion 109 on the anchor pin 104, the opposite ends of the springs 107 and 108 being carried in the holes 110 and 111 in the brake shoe webs 91 and 101 respectively.

The opposite ends 112 and 113 of the brake shoes 90 and 100 respectively engage opposite ends of an adjusting device 115 of conventional type. A tension spring 116 engages the rotating star wheel 117 of the adjusting device 115 to prevent rotation thereof after proper adjustment of the screw 118. Opposite ends of the spring 116 are carried in holes 119 and 120 in the brake shoe ends 112 and 113 respectively.

The supporting ends 83, 85 and 84, 86 of the brake shoe supporting member 80 can be accurately machined in a common plane whereby each of the brake shoes 90 and 100 will be carried accurately concentrically relative to the axis of the brake drum 45, and tilting of the brake shoes relative to the brake drum will be avoided during operation of the brake shoes.

The oppositely acting wheel cylinder pistons 72 engage the abutment portions 122 and 123 at the upper ends of the brake shoes 90 and 100 respectively whereby delivery of hydraulic fluid under pressure into the space 124 between the pistons results in hydraulic actuation of the brake mechanism. A rubber boot 125 is provided between each of the pistons 72 and the end of the wheel cylinder 70 to eliminate dirt from entry into the wheel cylinder bore 71.

Hydraulic fluid is delivered from the pedal operated master cylinder of the motor vehicle through passages 126 and 127 provided in the axle spindle 10. The outboard end of the passage 127 receives a seal member 128 that is positioned in a bore 129 provided in the axle spindle 10. The seal member 128 bridges the gap across the cooperating splines or serrations in the cooperating faces of the support member 73 and the end of the wheel spindle 10 to prevent loss of brake fluid in its passage to the passage 130 and the passage 131 provided in the wheel cylinder support member 73. These passages 130 and 131 conduct the hydraulic fluid to the wheel cylinder bore 71 for actuation of the wheel cylinder pistons 72.

The seal member 128 is retained in place by the retaining member 132 that has the passage 130 therein.

A bleed valve 133 is provided for the wheel cylinder 70. A removable plug 134 is provided in the wheel flange 20 to gain access to the bleed valve or plug 133 for bleeding the hydraulic lines to remove air from the same.

The mechanism thus far described constitutes the hydraulic brake mechanism that is operated in response to operation of the brake pedal of the motor vehicle, the brakes operating in conventional manner.

Auxiliary to the hydraulic brake mechanism there is provided a mechanical brake actuating mechanism that also operates the brake shoes 90 and 100.

This mechanical brake actuating mechanism includes an actuating shaft 140 that extends through the axial opening 14 in the axle spindle 10, the shaft 140 being journaled in the bearings 141 and 142 provided in opposite ends of the axial bore 14.

The actuating shaft 140 has the in-board end 143 splined to receive an actuating arm 144 that is secured on the end of the shaft 140 by a pin 145 extending radially through the arm 144 and the shaft 140. An O ring seal 146 prevents entry of foreign matter between the shaft 140 and its bearing journal 142.

The actuating arm 144 has the free end thereof connected with a flexible operating cable 150 that has a connector 151 pivotly secured to the free end of the arm 144 by a pivot connection 152. A flexible rubber boot 153 surrounds the open end of the cable 150 and extends between the connector 151 and the end 154 of a cable sheath 155 that is fastened to a bracket 156 carried on the kingpin journal 11.

The opposite end of the actuating shaft 140 carries an actuating arm 160 as connected thereto by a splined connection 161. A compression spring 162 is placed between the arm 160 and the journal bearing 141 of the shaft 140 to urge the shaft in one direction and thereby eliminate play and rattle from the shaft.

The actuating arm 160 has a link arm 163 attached thereto by a pivot pin 164. The opposite end of the link arm 163 is attached to a lever arm 165 by means of a pivot connection 166.

The lever arm 165 is carried upon the web 101 of the brake shoe 100 by means of a pivot pin 170.

The lever arm 165 has an edge groove 171 that engages an edge slot 172 in an actuating member 175 that extends between the actuating arm 165 and the web 91 of the brake shoe 90, as more particularly illustrated in Figure 5. The actuating member 175 has the end thereof opposite to the end containing the edge slot 172 provided with an edge slot 176 that engages an edge slot 177 in the web 91 of the brake shoe 90. A compression spring 180 is positioned between the actuating member 175 and the web 91 of the brake shoe 90 to continuously urge the actuating member 175 into engagement with the lever arm 165 and thereby retain the edge slot 172 of the actuating member 175 in engagement with the edge slot of the lever arm 165.

Figure 2:
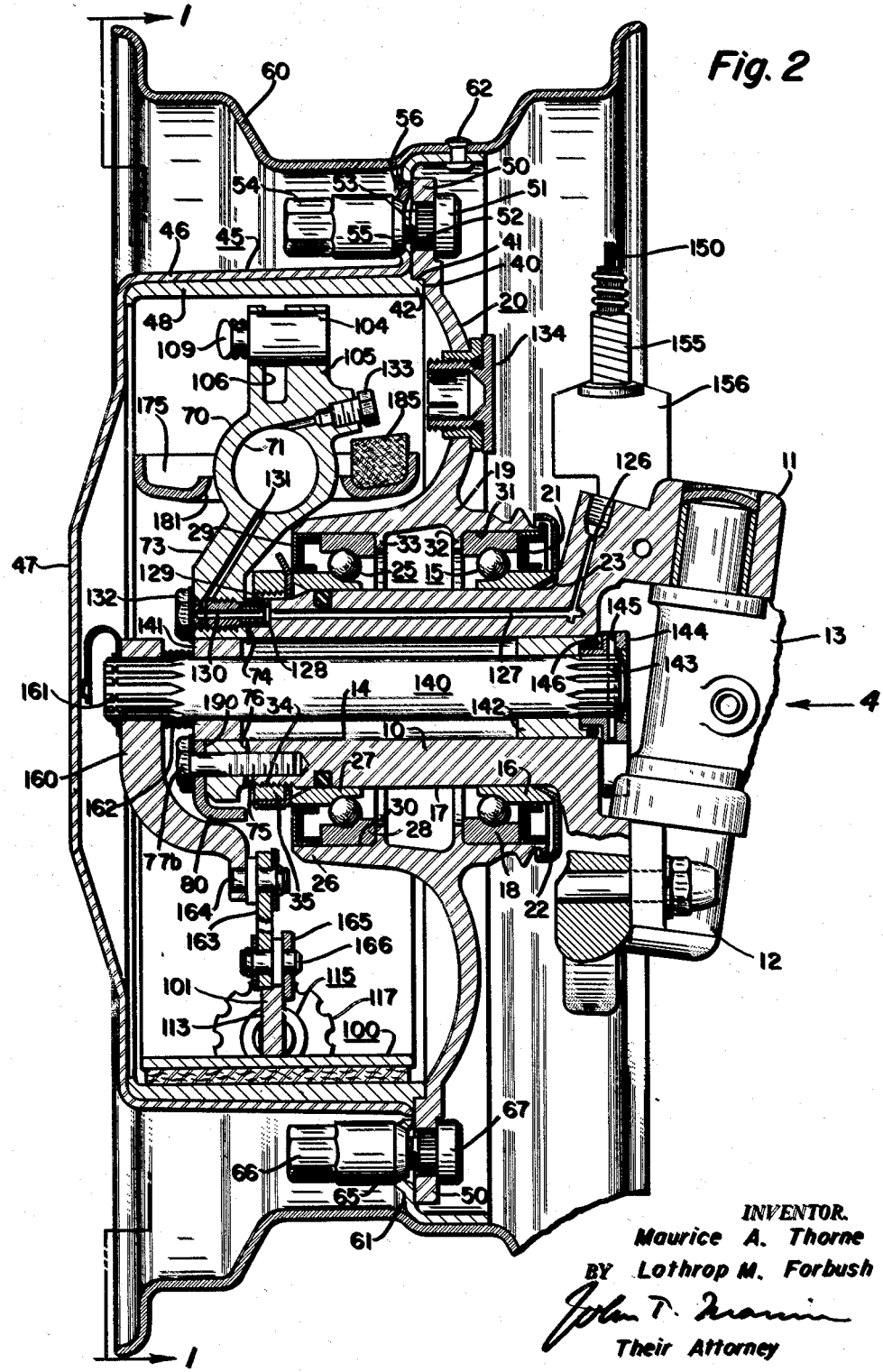
Figure 2 is a transverse cross sectional view of the brake mechanism as taken substantially along line 2—2 of Figure 1.
Figure 3:
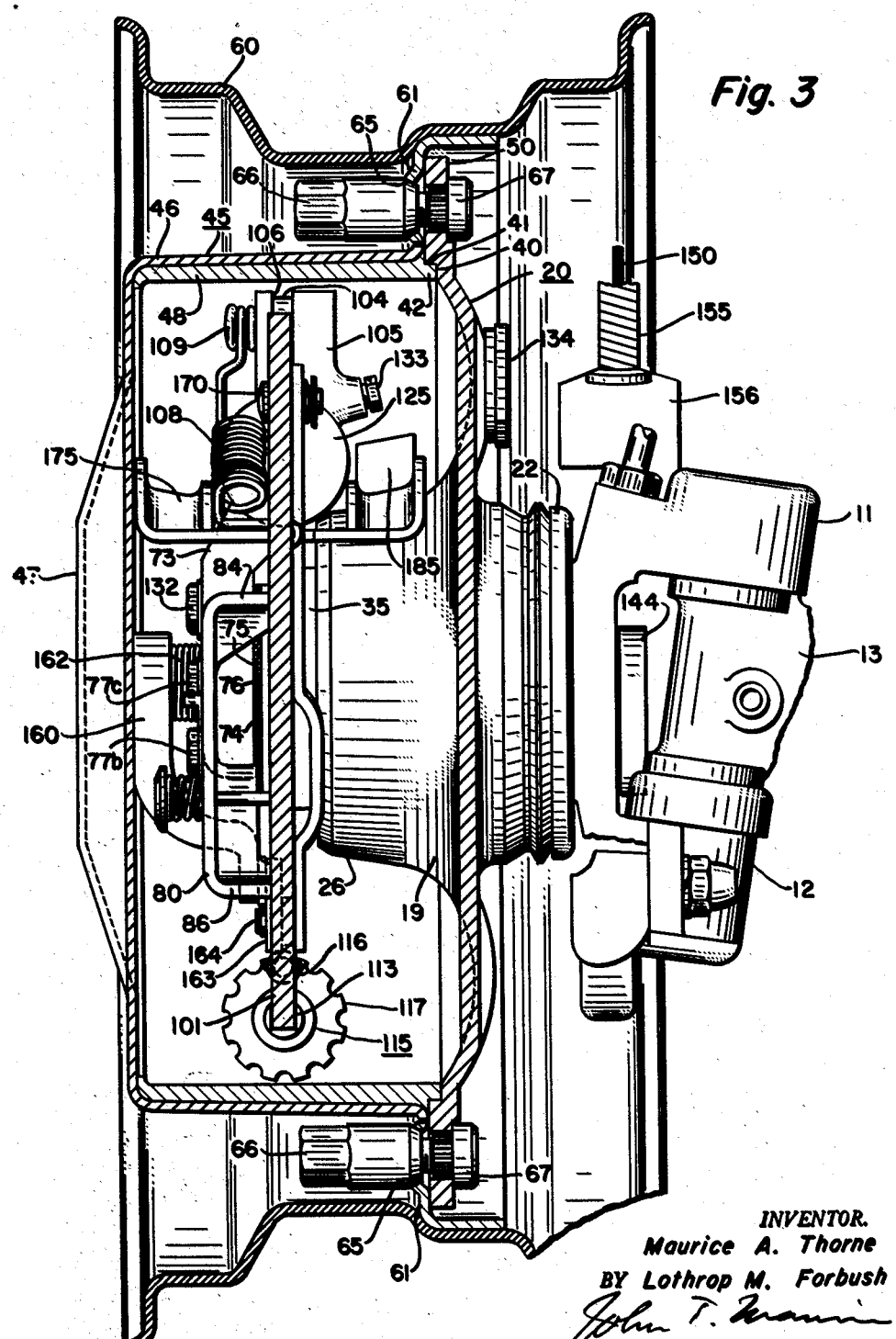
Figure 3 is a transverse cross sectional view of the brake mechanism taken along line 3—3 of Figure 1.

The actuating member 175 has a central opening 181 through which the wheel cylinder 70 extends, as illustrated in Figure 2. Thus, the actuating member 175 is symmetrically arranged around the wheel cylinder 70 to prevent any relative angular displacement between the lever arm 165 and the web 91 of the brake shoe 90 when the lever 165 is operated to urge the brake shoe 90 against the brake drum 45.

A felt pad 185 is carried on the member 175 beneath the bleed plug 133 to absorb any leakage of brake fluid from the wheel cylinder 70 and thereby prevent brake fluid from dropping onto the brake mechanism and finally finding its way to the surface between the brake linings and the brake drum. The member 175 has the upper surface thereof somewhat trough shaped to also aid in this purpose, and to give strength to the member 175 for transmission of braking effort from the lever 165 to the brake shoe 90 when the actuating cable 150 is rendered operative either by a hand brake operation or by a foot brake operation.

While the form of embodiment of the invention as herein disclosed constitutes a preferred form, it is to be understood that other forms might be adopted as may come within the scope of the claims which follow.

What is claimed is as follows:

1. In a motor vehicle brake mechanism, the combination of, a non-rotatable axle, a wheel rotatably supported on said axle, a brake drum carried on said wheel coaxial thereof, a brake shoe and cylinder support member having a hydraulic actuating cylinder with brake shoe actuating piston means therein and a support leg projecting substantially radially from one side of the cylinder and an anchor pin carrying boss projecting substantially radially from the opposite side of the cylinder, a slot in said boss parallel with and radial of the axis of said cylinder to receive adjacent ends of brake shoes, an anchor pin in said boss projecting through said slot, a pair of brake shoes within said drum for frictionally engaging said drum each having a substantially radially disposed web with each of adjacent ends of the webs of the shoes at one end thereof in said slot and engaging said anchor pin the portion thereof in said slot and provided with retraction spring means to effect operative connection between the said shoes and said pin and having opposite adjacent ends engaging an adjusting device, a shoe support member on said shoe and cylinder support member substantially in the plane of said leg and projecting from each side of the leg at substantially a right angle thereto forming thereby a substantially T-shaped structure and provided with shoe supporting legs at each end of said guide member extending axially of said axle and having their ends in a common plane extending substantially through the plane of the outboard vertical side of said slot in said boss and engaged by the webs of said shoes to dispose said webs in said common plane normal to said axle and maintain the said shoes positioned to frictionally engage said drum, and spring urged link means between said cooperating shoe supporting legs at each end of said shoe support member with the link means extending between said shoe support member and the shoe web engaged by the said shoe supporting legs to retain the shoe webs in engagement with the said shoe supporting legs to maintain the aforesaid structural alignment.

2. In a motor vehicle wheel and brake mechanism, the combination of, a non-rotatable axle, a wheel rotatably supported on said axle, a brake drum carried on said wheel coaxial thereof and forming therewith a brake chamber, said axle terminating within said drum and having a mounting face on the terminus end thereof, a brake shoe support leg secured on said mounting face and projecting substantially radially from said axle, said leg including integrally therewith an hydraulic actuating cylinder intermediate the ends of the leg, the said leg including an anchor pin carrying boss projecting substantially radially from the cylinder on the diametrically opposite side of the cylinder from the projection of the support leg therefrom, a slot in said boss parallel with and radial of the axis of said cylinder to receive the webs of adjacent ends of brake shoes, an anchor pin in said boss and projecting transversely through said slot, a pair of brake shoes within said drum for frictionally engaging said drum, said shoes having radial webs and the adjacent ends of said webs at one end thereof engaging said anchor pin within said sloth and provided with restraction spring means to effect connection between the said shoes and said pin and having the opposite adjacent ends engaging an adjusting device, a shoe guide member on said support leg substantially in the plane of said leg and projecting from each side of the leg at substantially a right angle thereto whereby to form with said leg a generally T-shaped structure with said anchor pin disposed at the end of the stem of the T-shaped structure, the projecting portions of said shoe guide member having surfaces at their extremities engaged by the webs of the shoes and disposed in a common plane that extends through the outboard side of said slot whereby to maintain the outboard side of the webs of the shoes in said common plane normal to the axis of said axle, said axle having a bore extending through the same axially therof, a rotatable shaft journaled within said bore of said axle and having opposite ends thereof projecting from opposite ends of said axle, actuating mean connected with said shaft on the external side of the wheel to effect rotation of the same, lever means pivotally mounted on one of said shoes, a brake shoe actuating member extending between said lever means and the other of said shoes substantially normal to the radial position of said support leg with said support leg extending through said actuating member with the actuating member disposed equally on opposite sides of said support leg, and link means between said lever and the opposite end of said shaft for actuation of said lever and thus said shoes thereby upon rotation of said shaft.

3. In a motor vehicle wheel and brake mechanism, the combination of, a non-rotatable axle, a wheel rotatably supported on said axle, a brake drum carried on said wheel coaxial thereof and forming therewith a brake chamber, said axle terminating within said drum and having a mounting face on the terminus end thereof, a brake shoe support leg secured on said mounting face and projecting substantially radially from said axle, said leg including integrally therewith an hydraulic actuating cylinder intermediate the ends of the leg, the said leg including an anchor pin carrying boss projecting substantially radially from the cylinder on the diametrically opposite side of the cylinder from the projection of the support leg therefrom, a slot in said boss parallel with and radial of the axis of said cylinder to receive the webs of adjacent ends of brake shoes, an anchor pin in said boss and projecting transversely through said slot, a pair of brake shoes within said drum for operatively engaging said drum, said shoes having radial webs and the adjacent ends of said webs at one end thereof engaging said anchor pin within said slot and provided with retraction spring means to effect connection between the said shoes and said pin and having the opposite adjacent ends engaging an adjusting device, and a shoe guide member on said support leg substantially in the plane of said leg and projecting from each side of the leg at substantially a right angle thereto whereby to form with said leg a generally T-shaped structure with said anchor pin disposed at the end of the stem of the T-shaped structure, the projecting portions of said shoe guide member having surfaces at their extremities engaged by the webs of the shoes and disposed in a common plane that extends through the outboard side of said slot whereby to maintain the outboard side of the webs of the shoes in said common plane normal to the axis of said axle, an actuating member placed around said hydraulic cylinder having one end connecting the cooperating end of said brake shoe web, a pivoting lever pivoted on the other cooperating adjacent shoe end and having a slot for receiving the opposite end of said actuating member, said pivoting lever extending downward within the brake drum, an operating lever mounted partially within said axle and extending within said brake drum, a connecting link between said operating lever and said pivoting lever, said operating lever extending inboard of said axle and adapted for connection with an operating means.

References Cited in the file of this patent

UNITED STATES PATENTS

| | | |
|---|---|---|
| 2,000,011 | Clancy | May 7, 1935 |
| 2,082,244 | Dick | June 1, 1937 |
| 2,111,297 | Pontius | Mar. 15, 1938 |
| 2,256,721 | Martin | Sept. 23, 1941 |
| 2,267,225 | Weeks et al. | Dec. 23, 1941 |
| 2,294,329 | Ayers et al. | Aug. 25, 1942 |
| 2,372,415 | Eksergian | Mar. 27, 1945 |
| 2,554,291 | Bradley et al. | May 22, 1951 |
| 2,649,922 | Hutchinson et al. | Aug. 25, 1953 |

FOREIGN PATENTS

| | | |
|---|---|---|
| 802,023 | France | May 30, 1936 |
| 802,620 | France | June 13, 1936 |
| 357,312 | Italy | Mar. 10, 1938 |